US012472657B2

(12) United States Patent
Chang

(10) Patent No.: US 12,472,657 B2
(45) Date of Patent: Nov. 18, 2025

(54) TABLE SAW GUARD

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 18/530,199

(22) Filed: Dec. 5, 2023

(65) Prior Publication Data

US 2025/0178233 A1 Jun. 5, 2025

(51) Int. Cl.
*B27G 19/02* (2006.01)
*B27G 19/08* (2006.01)

(52) U.S. Cl.
CPC ............. *B27G 19/02* (2013.01); *B27G 19/08* (2013.01)

(58) Field of Classification Search
CPC ......... B27G 19/02; B27B 19/08; B27B 27/04; B27B 5/243; B23D 59/02; B23D 45/06; Y10T 83/2077; Y10T 83/7734; Y10T 83/773; Y10T 83/872; Y10T 83/732
USPC ...... 83/478, 102.1, 102, 169, 469, 470, 471, 83/477.2
See application file for complete search history.

(56) References Cited

U.S. PATENT DOCUMENTS 11,213,971 B2 * 1/2022 Tsuda ..................... B27G 19/08
11,820,040 B2 * 11/2023 Huang ................... B27G 19/08
2009/0056514 A1 * 3/2009 Chen ..................... B27G 19/08 83/544
2009/0229437 A1 * 9/2009 Tanaka ................... B27G 19/02 83/440.2
2010/0101391 A1 * 4/2010 Chiu ...................... B27G 19/02 83/102.1
2011/0061506 A1 * 3/2011 Frolov ................... B27G 19/08 83/477.2
2011/0167976 A1 * 7/2011 Liu ........................ B27G 19/08 83/102.1
2012/0159763 A1 * 6/2012 Chiang .................. B27G 19/02 403/11
2023/0039598 A1 * 2/2023 Watson .................. B27G 19/02

* cited by examiner

*Primary Examiner* — Ghassem Alie
(74) *Attorney, Agent, or Firm* — Hershkovitz & Associates, PLLC; Abe Hershkovitz

(57) ABSTRACT

A table saw guard has a riving knife, a mounting frame, a blade guard, and a switch. The riving knife has a first positioning slot and a second positioning slot. The mounting frame has a first positioning pin to enter or withdraw from the first positioning slot. The blade guard and the switch are pivotally connected to the mounting frame, and the switch has a second positioning pin. When the switch pivots toward a locking position, the second positioning pin is located in the second positioning slot to position the riving knife with respect to the mounting frame; when the switch pivots toward an unlocking position, the second positioning pin withdraws from the second positioning slot, which allows the first positioning pin to withdraw from the first positioning slot such that the riving knife and the mounting frame are detached.

10 Claims, 12 Drawing Sheets

TABLE SAW GUARD

BACKGROUND OF THE INVENTION

1. Field of the Invention

The present invention relates to a safety device for a cutting machine, and particularly to a table saw guard.

2. Description of Related Art

In use of a table saw, a safety device is necessary for protecting an operator from injury. Commonly, the safety device, regarded as a table saw guard, includes a blade guard and a riving knife. The riving knife rides within a kerf on a workpiece and maintains an even gap between two cut sides of the workpiece to prevent the workpiece from being ejected toward an operator and injuring the operator. The blade guard covers the saw blade to prevent the operator from being wounded by the saw blade when not processing.

However, in a conventional table saw guard, the blade guard and the riving knife are both disposed on a mount via bolts; thereby, the blade guard and the riving knife are difficult to be detached from each other such that cleaning and maintenance thereof can be time-consuming and troublesome.

To overcome the shortcomings of the conventional table saw guard, the present invention tends to provide a table saw guard to mitigate or obviate the aforementioned problems.

SUMMARY OF THE INVENTION

The main objective of the present invention is to provide a table saw guard that is easy to be detached and is convenient for users to clean and maintain.

The table saw guard has a riving knife, a mounting frame, a blade guard, and a switch. The riving knife has a knife body and two positioning slots recessed on the knife body at a spaced interval and respectively being a first positioning slot and a second positioning slot. The mounting frame has a first positioning pin configured to enter or withdraw from the first positioning slot. The blade guard and the switch are both pivotally connected to the mounting frame, and the switch has a second positioning pin configured to enter or withdraw from the second positioning slot. The switch is pivotally connected to the mounting frame and is configured to pivot to a locking position or an unlocking position. When the switch is located at the locking position, the second positioning pin is located in the second positioning slot to position the riving knife with respect to the mounting frame; when the switch pivots toward the unlocking position, the second positioning pin withdraws from the second positioning slot, which allows the first positioning pin to withdraw from the first positioning slot so as to detach the riving knife and the mounting frame.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
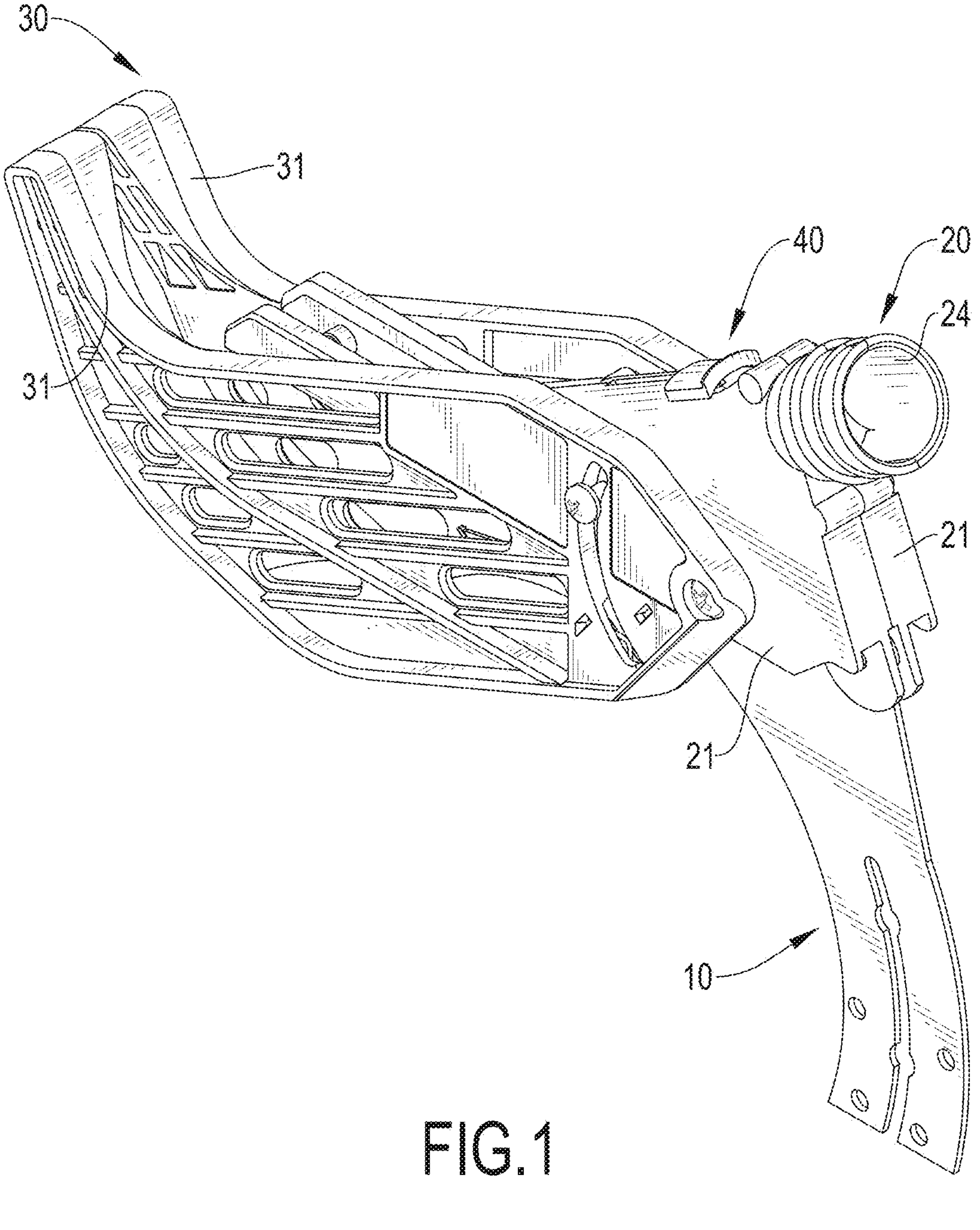
FIG. 1 is a perspective view of a table saw guard of a preferred embodiment in accordance with the present invention.

With reference to FIG. 1, a table saw guard of a preferred embodiment in accordance with the present invention has a riving knife 10, a mounting frame 20, a blade guard 30, and a switch 40. The riving knife 10 is configured to be mounted on a machine frame of a table saw; the mounting frame 20 and the riving knife 10 are detachably connected to each other, and the blade guard 30 and the switch 40 are connected to the mounting frame 20.

Figure 3:
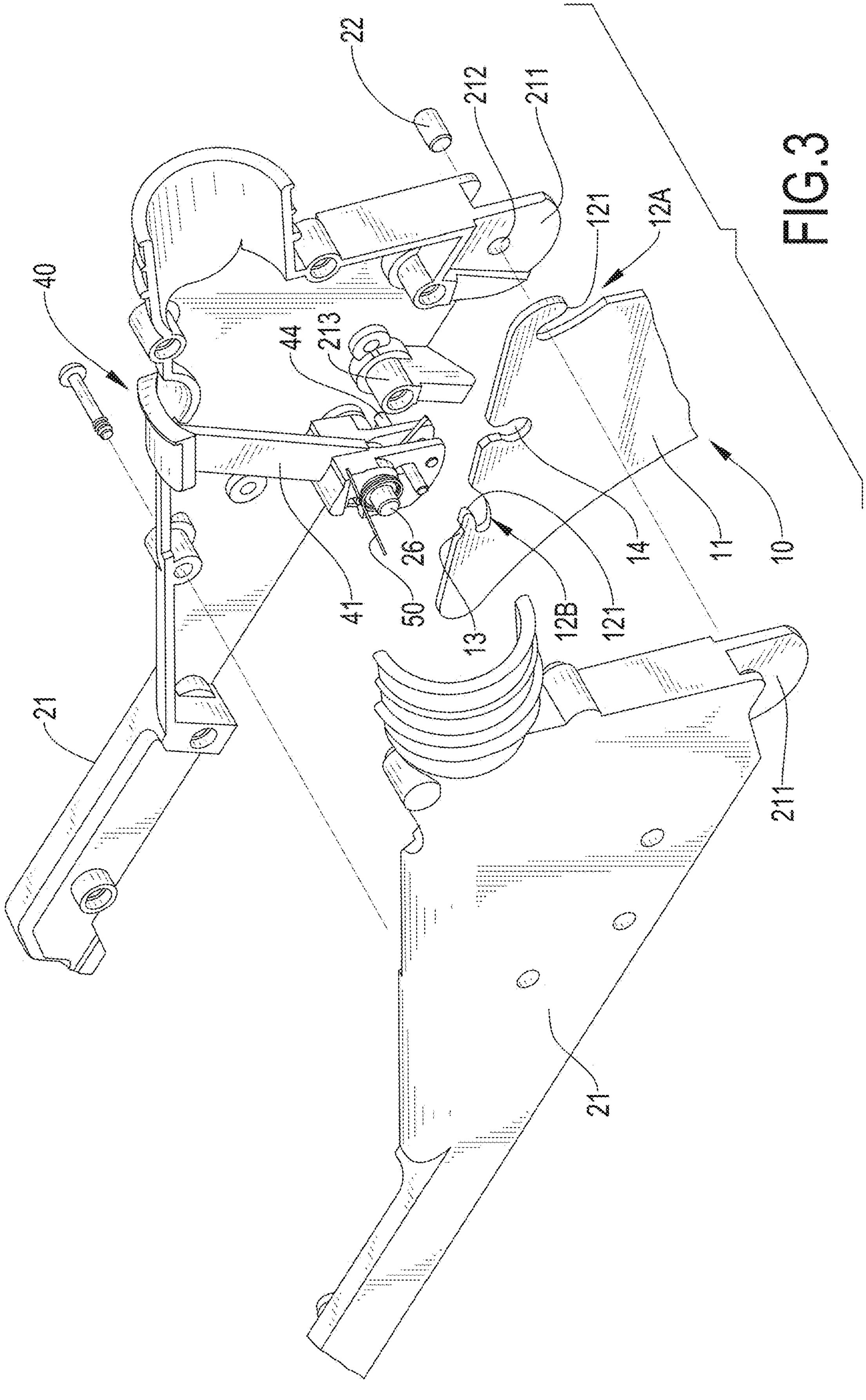
FIG. 3 is an exploded view of a mounting frame of the table saw guard in FIG. 1.

With reference to FIG. 1, the riving knife 10 is utilized for preventing a workpiece from being ejected toward an operator, and the riving knife 10 has several holes and an arc-shaped slot at a bottom of the riving knife 10 to allow the riving knife 10 to be mounted on the machine frame of the table saw. With reference to FIG. 3, the riving knife 10 has a knife body 11 and two positioning slots respectively being a first positioning slot 12A and a second positioning slot 12B. With reference to FIG. 1, the knife body 11 tapers from a top of the knife body 11 toward a bottom of the knife body 11. With reference to FIG. 3, the first positioning slot 12A and the second positioning slot 12B are recessed on the knife body 11, extend in a curve, and are arranged at a spaced interval. In the preferred embodiment, each one of the first positioning slot 12A and the second positioning slot 12B has an opening 121; the opening 121 of the first positioning slot 12A and the opening 121 of the second positioning slot 12B respectively face toward two different directions.

Figure 4:
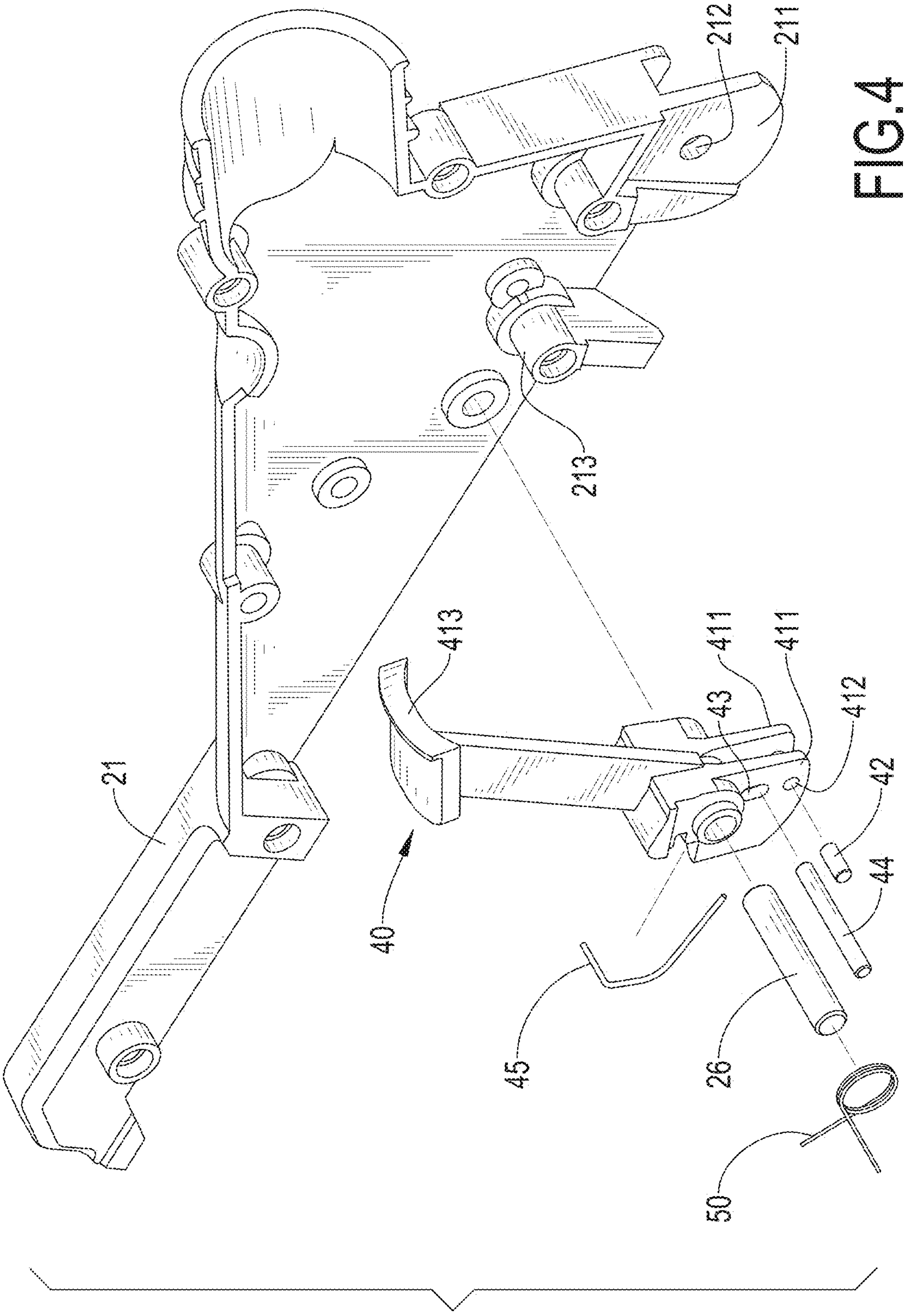
FIG. 4 is an exploded view of a switch of the table saw guard in FIG. 1.
Figure 5:
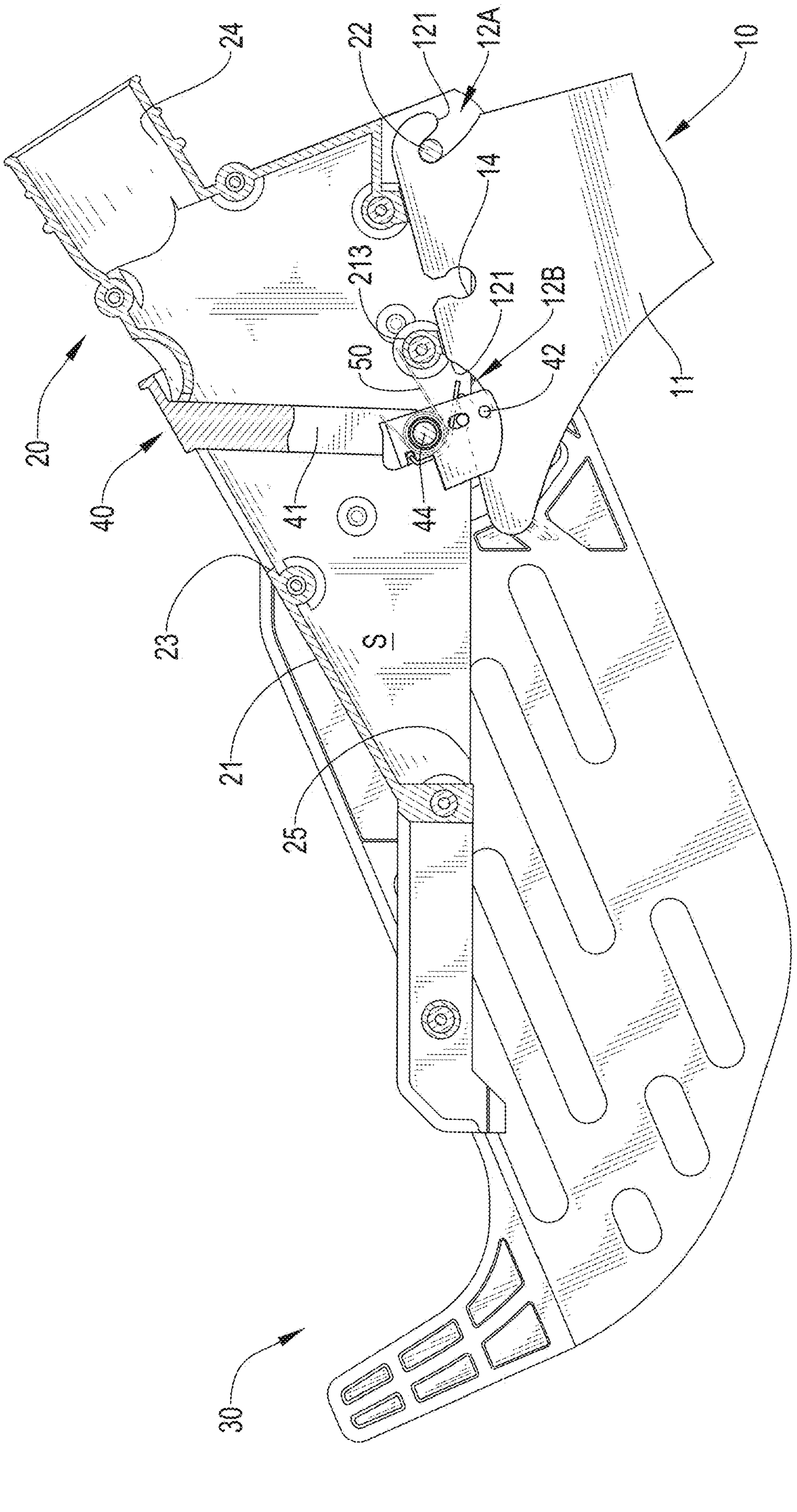
FIG. 5 is a sectional side view of the table saw guard in FIG. 1.

With reference to FIGS. 3 and 5, the mounting frame 20 has a first positioning pin 22 configured to enter or withdraw from the first positioning slot 12A of the riving knife 10 for positioning or detachment. With reference to FIGS. 2 to 5, specifically, the mounting frame 20 is hollow and has an interior space S and two half shells 21, and the first positioning pin 22 is connected to the two half shells 21. Each one of the two half shells 21 has a connecting portion 213, and said connecting portions 213 of the two half shells 21 are connected to each other via screws to fix the two half shells 21. The interior space S is formed between the two half shells 21.

In the preferred embodiment, each one of the two half shells 21 has a wing board 211 and a fixed hole 212 disposed on the wind board 211, and said wing boards 211 of the two half shells 21 are arranged at a spaced interval. The first positioning pin 22 is disposed between and fixed to said wing boards 211 of the two half shells 21 by being tightly inserted into said fixed holes 212 of the two half shells 21 such that when the first positioning pin 22 enters the first positioning slot 12A, a portion of the riving knife 10 around the first positioning slot 12A is limited between said wing boards 211 of the two half shells 21, which enhances positioning effect and prevents the riving knife 10 and the mounting frame 20 from unexpected detachment.

Figure 2:
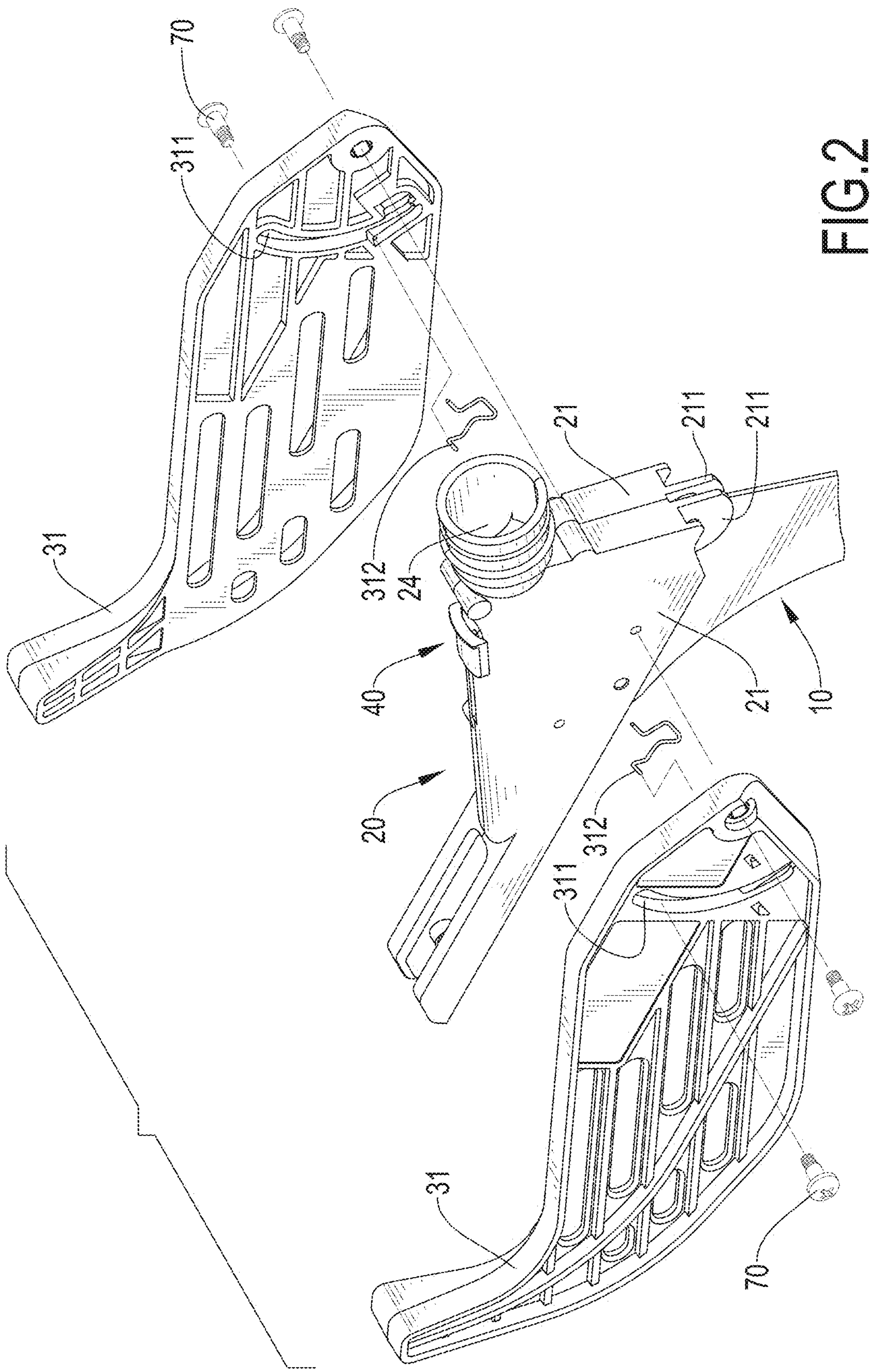
FIG. 2 is an exploded view of a blade guard of the table saw guard in FIG. 1.

With reference to FIGS. 1 and 2, the blade guard 30 is pivotally connected to the mounting frame 20 and is utilized for protecting the operator from being cut by a saw blade of the table saw. Specifically, the blade guard 30 has two guarding wings 31, and the two guarding wings 31 are respectively connected to two opposite sides of the mounting frame 20 and are configured to pivot relative to the mounting frame 20.

In the preferred embodiment, each one of the two guarding wings 31 has an arc-shaped hole 311, and the table saw guard has two limiting screws 70; each one of the two limiting screws 70 is fixed on the mounting frame 20 and is mounted through the arc-shaped hole 311 of a respective one of the two guarding wings 31. When each one of two opposite ends of the arc-shaped hole 311 abuts against said limiting screw 70, pivoting of said guarding wing 31 is stopped. Thereby, said limiting screw 70 can limit a pivoting range of said guarding wing 31 relative to the mounting frame 20.

With reference to FIGS. 3 to 6, the switch 40 is pivotally connected to the mounting frame 20; specifically, the switch 40 is disposed in the interior space S of the mounting frame 20 and connected to the mounting frame 20 via a pivot shaft 26. The switch 40 has a second positioning pin 42 configured to enter or withdraw from the second positioning slot 12B of the riving knife 10 for positioning or detachment. That is, the first positioning pin 22 in the first positioning slot 12A and the second positioning pin 42 in the second positioning slot 12B are regarded as two positioning points for positioning the riving knife 10 with respect to the mounting frame 20.

Figure 7:
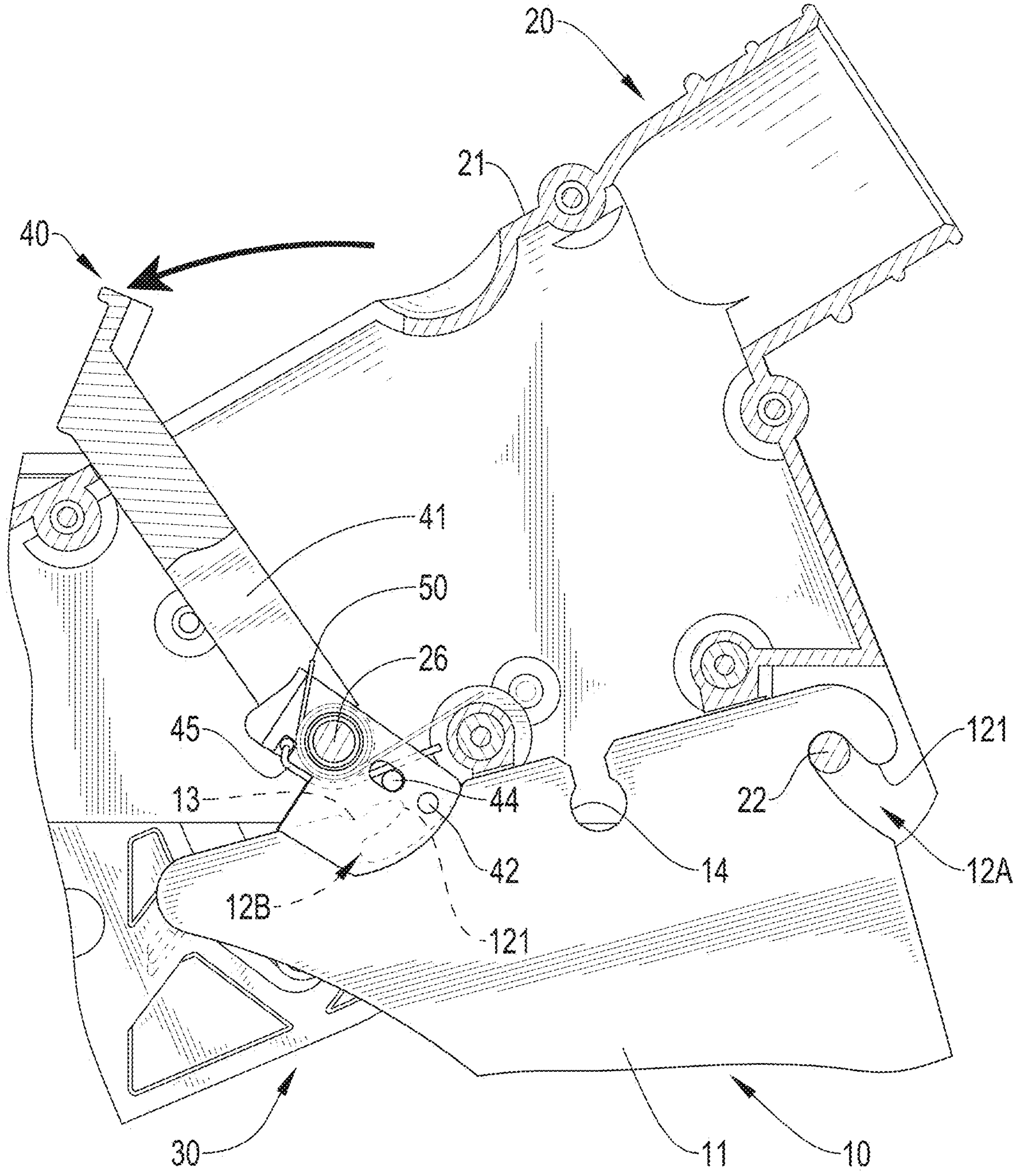
FIGS. 7 to 9 are operational side views in partial sections of the table saw guard in FIG. 1.

Specifically, the switch 40 is configured to pivot relative to the mounting frame 20 to a locking position as shown in FIG. 5 or an unlocking position as shown in FIG. 7. When the switch 40 pivots to the locking position, the second positioning pin 42 enters the second positioning slot 12B from the opening 121; when the switch 40 pivots to the unlocking position, the second positioning pin 42 withdraws from the second positioning slot 12B through the opening 121.

In the preferred embodiment, the switch 40 has a main body 41 having two wing portions 411 and two connecting holes 412. The two wing portions 411 are arranged at a spaced interval, and the two connecting holes 412 are respectively disposed on the two wing portions 411. The second positioning pin 42 is disposed between and fixed to the two wing portions 411 by being tightly inserted into the two connecting holes 412 such that when the second positioning pin 42 enters the second positioning slot 12B, a portion of the riving knife 10 around the second positioning slot 12B is limited between the two wing portions 411, which enhances positioning effect and prevents the riving knife 10 and the mounting frame 20 from unexpected detachment.

Figure 6:
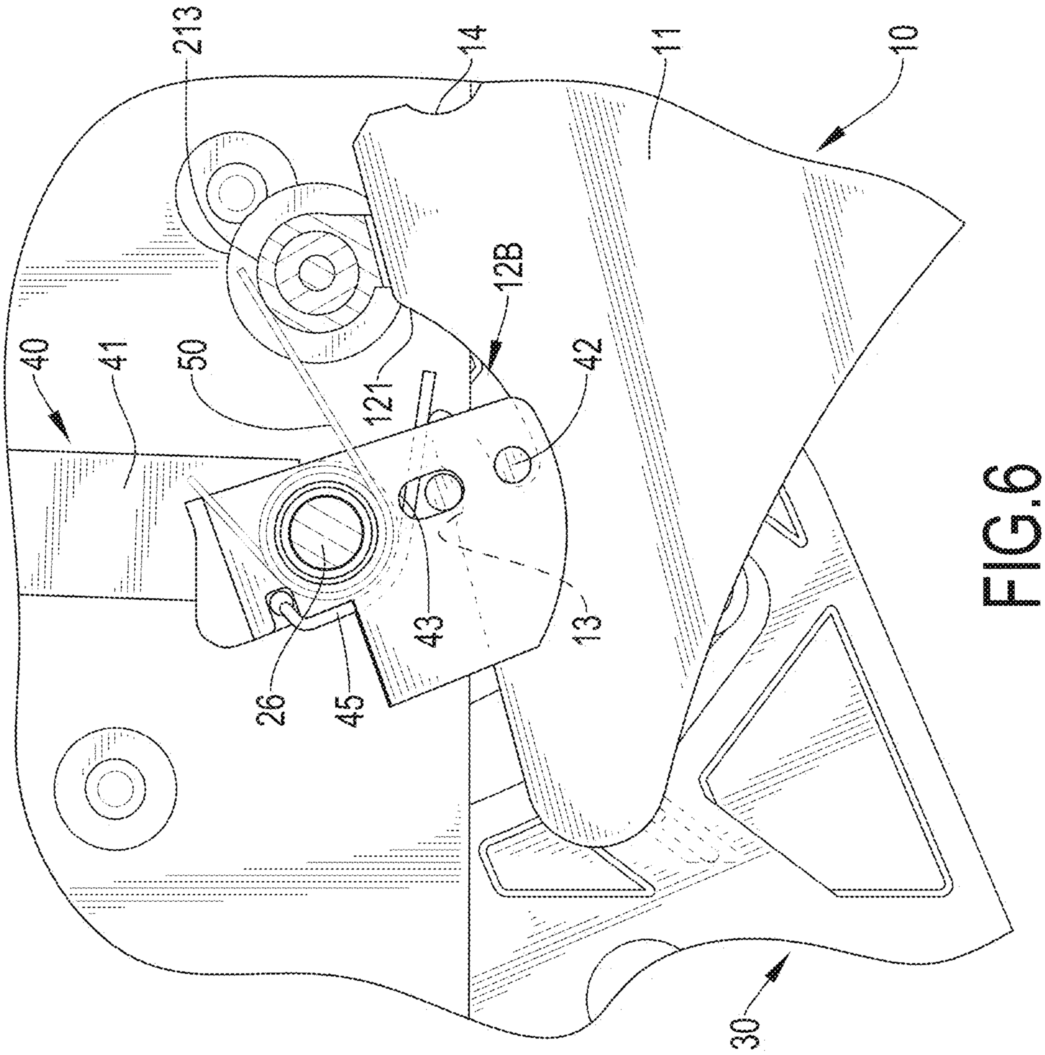
FIG. 6 is an enlarged view of FIG. 5.

In use, when the riving knife 10 and the mounting frame 20 are assembled, with reference to FIGS. 5 and 6, the first positioning pin 22 and the second positioning pin 42 are respectively located the innermost of the first positioning slot 12A and the innermost of the second positioning slot 12B for positioning the riving knife 10 with respect to the mounting frame 20. If the table saw guard needs to be detached, with reference to FIG. 7, the operator first pivots the switch 40 relative to the mounting frame 20 toward the unlocking position, and the second positioning pin 42 thus moves along the second positioning slot 12B and withdraws from the second positioning slot 12B through the opening 121. Therefore, the second positioning pin 42 is not limited by the second positioning slot 12B, and one of the two positioning points is unlocked.

In the preferred embodiment, the table saw guard further has a torsion spring 50 disposed on the pivot shaft 26. The torsion spring 50 abuts against the switch 40 and the mounting frame 20, and more specifically against the connecting portion 213, and the torsion spring 50 is configured to provide a force for pushing the switch 40 to pivot toward the unlocking position. Thereby, once the second positioning pin 42 withdraws from the second positioning slot 12B through the opening 121 and is not limited by the second positioning slot 12B anymore, the torsion spring 50 pushes the torsion spring 50 to the unlocking position. The above configurations allow unlocking of the switch 40 to be easier and more convenient and prevent the switch 40 from unexpected pivoting backward toward the locking position.

Figure 8:
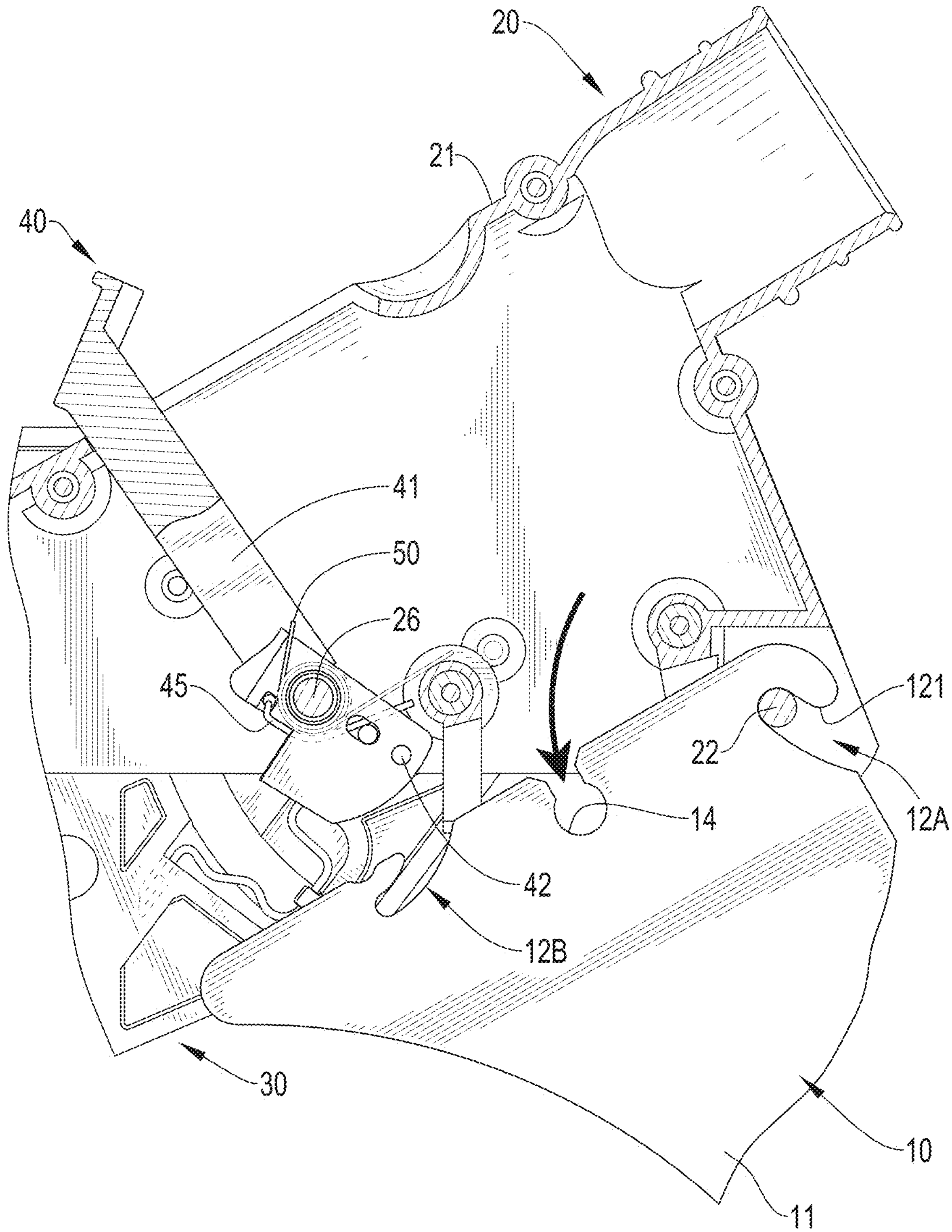
Figure 9:
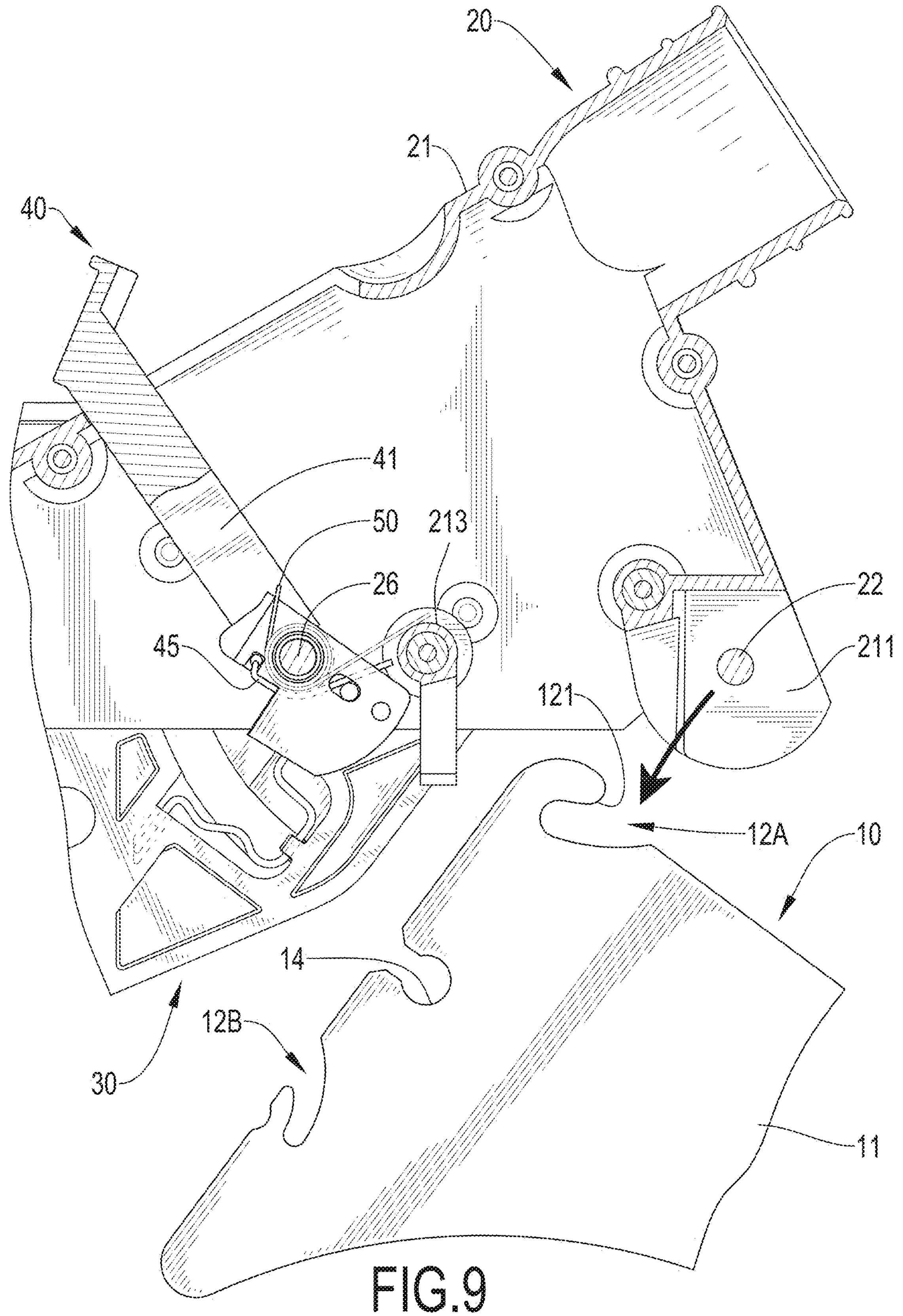

Then, since the second positioning pin 42 withdraws from the second positioning slot 12B, only one of the two positioning points is left. With reference to FIG. 8, the riving knife 10 and the mounting frame 20 can thus relatively swing to adjust an angle therebetween. With reference to FIG. 9, after the angle between the riving knife 10 and the mounting frame 20 is adjusted properly, the first positioning pin 22 is allowed to move along and withdraw from the first positioning slot 12A through the opening 121 by relatively moving the riving knife 10 and the mounting frame 20, and the riving knife 10 and the mounting frame 20 can be detached for cleaning or maintenance of the riving knife 10 and the blade guard 30.

With the above configurations, the table saw guard in the present invention adopts pins and slots for positioning the riving knife 10 with respect to the mounting frame 20, which allows the operator to detach the riving knife 10 and the mounting frame 20 more easily and quickly compared to the conventional safety device of the saw blade having the blade guard and the riving knife both disposed on the mount via bolts. Thereby, the present invention sharply improves convenience of cleaning and maintenance of the riving knife 10 and the blade guard 30 and saves a great amount of time.

After cleaning or maintenance, the operator can also assemble the riving knife 10 and the blade guard 30 easily and quickly by undergoing the above-mentioned process reversely. The first positioning pin 22 is moved to enter the first positioning slot 12A from the opening 121 and moves along the positioning slot 12A to the innermost of the first positioning slot 12A by relatively moving the riving knife 10 and the mounting frame 20. Then, the riving knife 10 and the mounting frame 20 are relatively swung to a proper angle, and the switch 40 is pivoted toward the locking position such that the second positioning pin 42 is moved to enter the second positioning slot 12B from the opening 121 thereof and moves along the second positioning slot 12B to the innermost of the second positioning slot 12B. Finally, the riving knife 10 is repositioned with respect to the mounting frame 20, which allows the riving knife 10 to be assembled with the mounting frame 20 and the blade guard 30 on the mounting frame 20 again. Reassembling of the riving knife 10, the mounting frame 20, and the blade guard 30 is also easier and takes less time.

With reference to FIG. 5, in the preferred embodiment, the opening 121 of the first positioning slot 12A and the opening 121 of the second positioning slot 12B respectively face toward two different directions, which provides a stronger positioning effect; thereby, casual relative movement between the riving knife 10 and the mounting frame 20 and unexpected detachment of the above-mentioned two can be prevented. Moreover, the two positioning slots extend in a curve, allowing operation of detachment and reassembling to be more fluent.

Additionally, with reference to FIGS. 4 and 6, in the preferred embodiment, the riving knife 10 has a positioning recess 13 recessed on the knife body 11 and disposed adjacently to the second positioning slot 12B, and the switch 40 has two limiting holes 43, a switch positioning pin 44, and an elastic unit 45. The two limiting holes 43 are respectively disposed on the two wing portions 411 of the main body 41 of the switch 40. The switch positioning pin 44 is mounted through the two limiting holes 43 and is configured to move along the two limiting holes 43. The elastic unit 45 is specifically a steel wire bent as a curved line and disposed between the two wing portions 411.

When the switch positioning pin 44 is about to enter or withdraw from the positioning recess 13 as the switch 40 pivots, the switch positioning pin 44 first abuts the elastic unit 45; thereby, the operator needs to apply a sufficient force such that the switch positioning pin 44 abuts against the elastic unit 45 to deform so as to allow the switch positioning pin 44 to enter or withdraw from the positioning recess 13 afterward. The switch positioning pin 44 and the elastic unit 45 prevent the switch 40 from casual pivoting without the operator's operation.

With reference to FIG. 5, in the preferred embodiment, the mounting frame 20 has a top opening 23 formed on a top of the mounting frame 20 and communicating with the interior space S of the mounting frame 20. The switch 40 disposed in the interior space S extends to an exterior of the mounting frame 20 from the top opening 23; specifically, the main body 41 of the switch 40 has an operating portion 413 exposed from the top opening 23. Thereby, the operator can pivot the switch 40 by operating the operating portion 413, and other mechanisms can be hidden in the mounting frame 20.

Further, with reference to FIGS. 2 and 5, in the preferred embodiment, the mounting frame 20 has an outlet 24 and a bottom opening 25. The outlet 24 is formed on the top of the mounting frame 20 and communicates with the interior space S of the mounting frame 20. The bottom opening 25 is formed on a bottom of the mounting frame 20, communicates with the interior space S, and is configured to face the saw blade of the table saw. With the configurations of the outlet 24 and the bottom opening 25, the operator can connect the outlet 24 to a dust collector via a pipeline. When cutting, sawdust produced around the saw blade can be sucked into and collected by the dust collector through the bottom opening 25, the interior space S, the outlet 24, and the pipeline, which prevents sawdust from accumulating inside the table saw guard and reduces frequency of repairing or maintenance.

Figure 10:
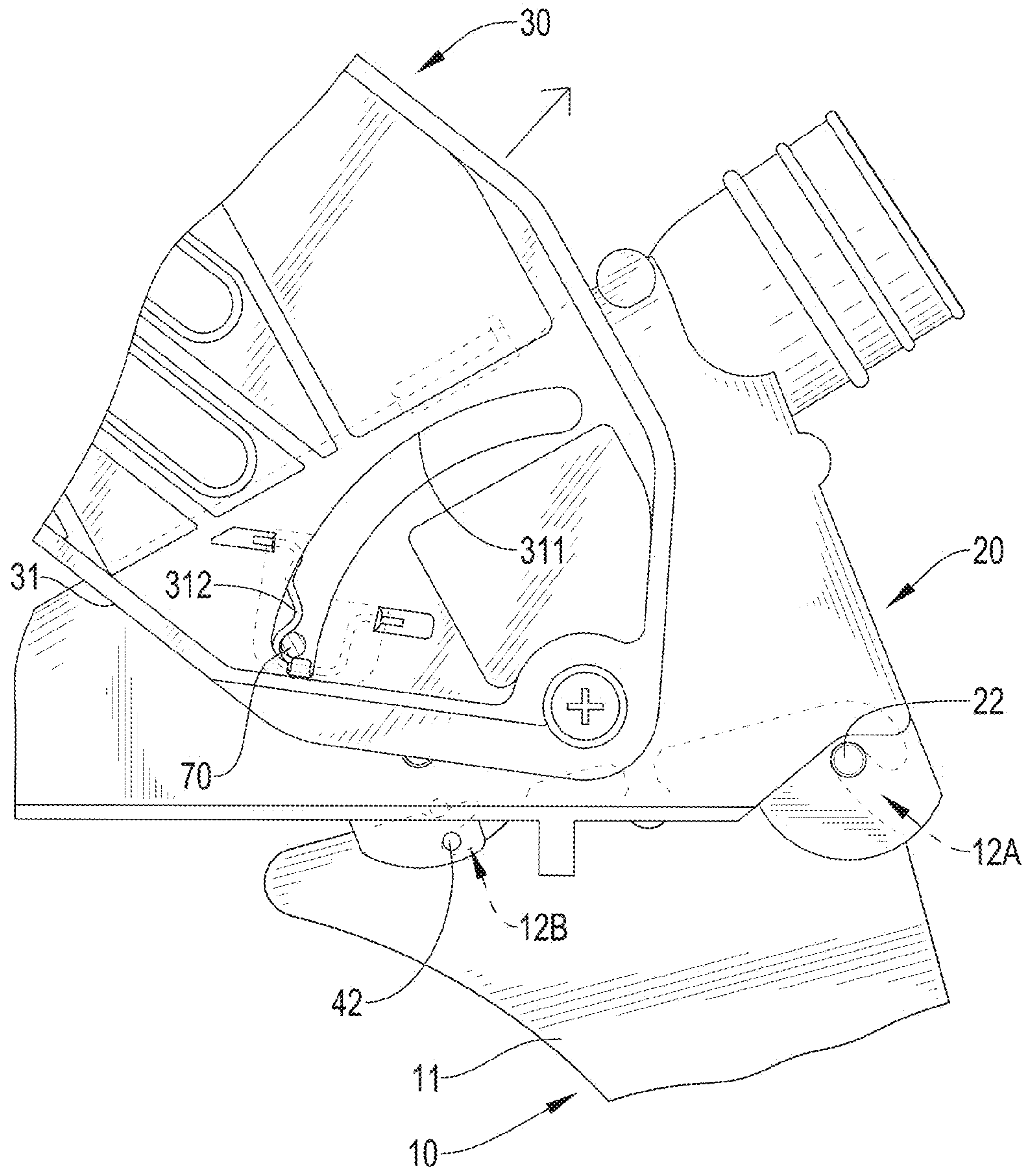
FIG. 10 is an operational side view of the table saw guard in FIG. 1.

With reference to FIGS. 2 and 10, in the preferred embodiment, each one of the two guarding wings 31 of the blade guard 30 has an elastic positioning unit 312. The elastic positioning unit 312 extends into the arc-shaped hole 311, and in the preferred embodiment, the elastic positioning unit 312 specifically adopts a steel wire bent curvedly and mounted in holes on said guarding wings 31.

When the operator applies an external force to pivot said guarding wing 31 relative to the mounting frame 20 and lift said guarding wing 31, the elastic positioning unit 312 approaches the corresponding limiting screw 70 and is configured to be compressed by the corresponding limiting screw 70. Then, the corresponding limiting screw 70 is located at one of two ends of the arc-shaped hole 311, and the elastic positioning unit 312 is not compressed by the corresponding limiting screw 70 and recovers elastically to an original position; hence, with reference to FIG. 10, the elastic positioning unit 312 abuts against the corresponding limiting screw 70 downward to allow said guarding wing 31 to be positioned in a lifted condition, which is convenient for the operators to clean or maintain the saw blade.

Figure 11:
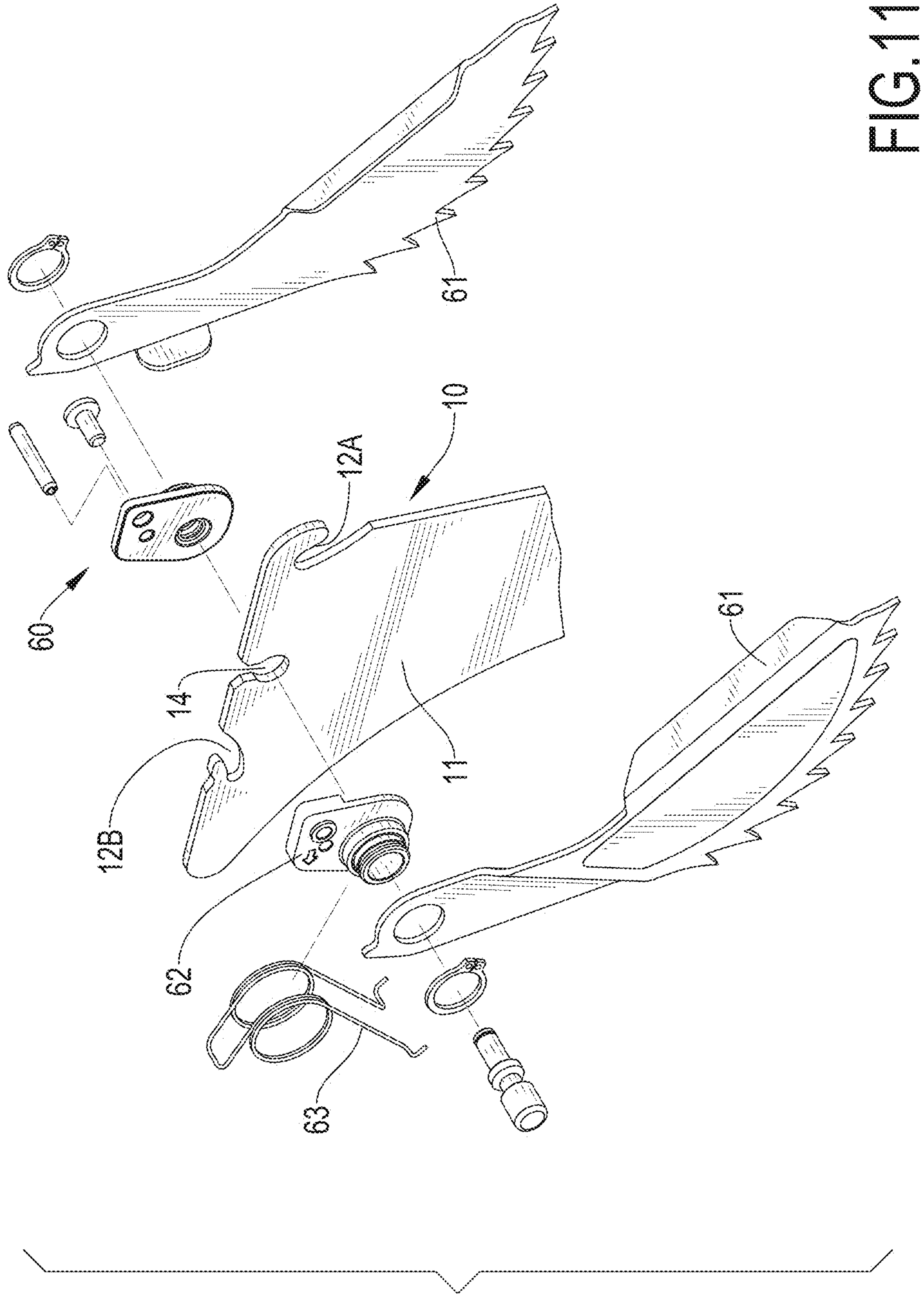
FIG. 11 is an exploded view of an anti-kickback mechanism from a riving knife of the table saw guard of another preferred embodiment in accordance with the present invention.

With reference to FIG. 11, in another preferred embodiment, the table saw guard may further have an anti-kickback mechanism 60 based on the above-described preferred embodiment. Specifically, the riving knife 10 has a mounting hole 14 disposed on the knife body 11, and the anti-kickback mechanism 60 has two anti-kickback pawls 61, two pawl mounts 62, and a recovering spring 63. The two anti-kickback pawls 61 are pivotally connected to the mounting hole 14 of the riving knife 10 via the two pawl mounts 62 and several fasteners such as bolts. The recovering spring 63 is specifically a torsion spring and is utilized for providing a recovering force to the two anti-kickback pawls 61.

Figure 12:
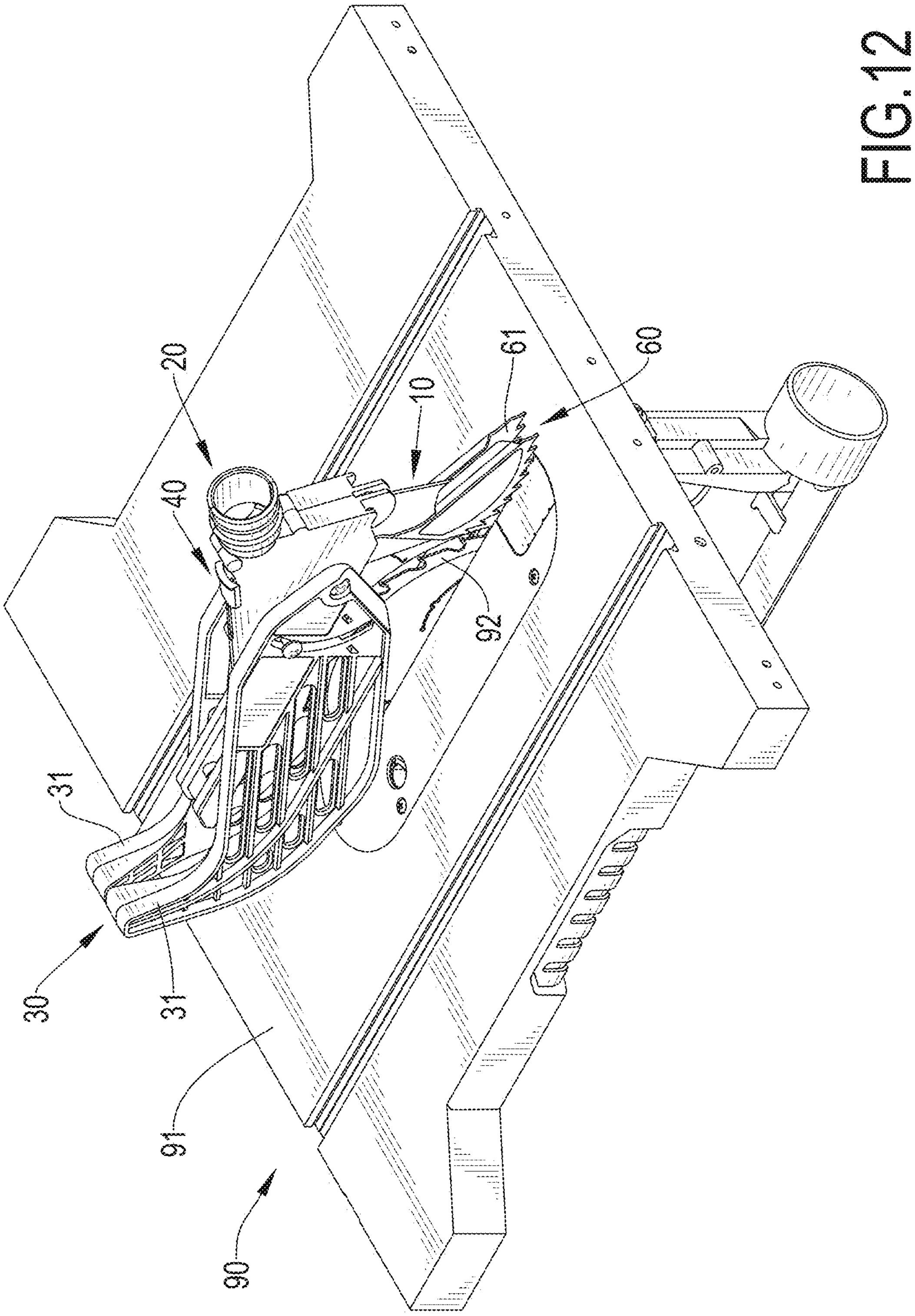
FIG. 12 is a perspective view of the table saw guard in FIG. 11, applied on a table saw.

With reference to FIG. 12, when the table saw guard is applied on a table saw 90, the mounting frame 20 is placed above a saw blade 92 protruding from a processing platform 91, and a portion of the saw blade 92 is covered between two guarding wings 31 of the blade guard 30. The riving knife 10 and the two anti-kickback pawls 61 of the anti-kickback mechanism 60 are placed at a rear side of the saw blade 92 (right side of FIG. 12). When processing, a workpiece is moved on the processing platform 91 from a front side of the saw blade 92 to the rear side of the saw blade 92 (left side to right side in FIG. 12). The workpiece first abuts the blade guard 30 to slightly pivot and lift the blade guard 30 such that the workpiece can be cut by the saw blade 92.

Then, the workpiece is gradually divided into two pieces, and the two pieces can be separated by the riving knife 10 to avoid the two pieces abutting each other, which prevents the workpiece from being ejected toward the operator. Afterwards, the divided two pieces abut and pivot the two anti-kickback pawls 61 relative to the riving knife 10, and the two anti-kickback pawls 61 continue to abut against the two pieces via the recovering force from the recovering spring 63 and prevent the two pieces from moving backward, which further improves the safety of operating the table saw 90.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A table saw guard comprising:

a riving knife having a knife body; and two positioning slots recessed on the knife body at a spaced interval and respectively being a first positioning slot and a second positioning slot;

a hollow mounting frame having a first positioning pin configured to enter or withdraw from the first positioning slot;

a bottom opening formed on a bottom of the mounting frame, communicating with the interior space of the mounting frame, and configured to face a saw blade of a table saw; and an outlet formed on a top of the mounting frame, communicating with the interior space of the mounting frame, and being tube-shaped to be connectable to a dust connector via a pipeline;

a blade guard pivotally connected to the mounting frame; and a switch pivotally connected to the mounting frame, configured to pivot between a locking position and an unlocking position, and having a second positioning pin configured to enter or withdraw from the second positioning slot;

wherein when the switch is located at the locking position, the second positioning pin is located in the second positioning slot to position the riving knife with respect to the mounting frame; when the switch pivots toward the unlocking position, the second positioning pin withdraws from the second positioning slot, which allows the first positioning pin to withdraw from the first positioning slot so as to detach the riving knife and the mounting frame;

each one of the two positioning slots extends in a curve and has an opening;

said openings of the two positioning slots respectively face toward two different directions;

the riving knife has a positioning recess recessed on the knife body and disposed adjacent to the second positioning slot;

the switch has two limiting holes;

a switch positioning pin mounted through the two limiting holes, configured to move along the two limiting holes, and configured to enter or withdraw from the positioning recess; and an elastic unit; and when the switch pivots toward the locking position or the unlocking position, the switch positioning pin abuts the elastic unit to deform so as to allow the switch positioning pin to enter or withdraw from the positioning recess.

2. The table saw guard as claimed in claim 1, wherein the table saw guard has a torsion spring disposed on a pivot shaft of the table saw guard between the switch and the mounting frame, abutting against the switch and the mounting frame, and configured to provide a force for pushing the switch to pivot toward the unlocking position.

3. The table saw guard as claimed in claim 1, wherein the mounting frame has two wing boards arranged at a spaced interval;

the first positioning pin is disposed between and fixed to the two wing boards; and the two wing boards limit a portion of the riving knife around the first positioning slot therebetween when the first positioning pin enters the first positioning slot.

4. The table saw guard as claimed in claim 3, wherein the switch has two wing portions arranged at a spaced interval;

the second positioning pin is disposed between and fixed to the two wing portions; and the two wing portions limit a portion of the riving knife around the second positioning slot therebetween when the second positioning pin enters the second positioning slot.

5. The table saw guard as claimed in claim 1, wherein the switch has two wing portions arranged at a spaced interval;

the second positioning pin is disposed between and fixed to the two wing portions; and the two wing portions limit a portion of the riving knife around the second positioning slot therebetween when the second positioning pin enters the second positioning slot.

6. The table saw guard as claimed in claim 1, wherein the mounting frame has two half shells connected to each other and forming the interior space therebetween.

7. The table saw guard as claimed in claim 1, wherein the mounting frame is hollow and has a top opening formed on a top of the mounting frame and communicating with an interior of the mounting frame; and the switch is disposed in the interior of the mounting frame and extends to an exterior of the mounting frame from the top opening.

8. The table saw guard as claimed in claim 1, wherein the blade guard has two guarding wings respectively connected to two opposite sides of the mounting frame, configured to pivot relative to the mounting frame, and each one of the two guarding wings having an arc-shaped hole; and the table saw guard has two limiting screws, each one of the two limiting screws fixed on the mounting frame and mounted through the arc-shaped hole of a respective one of the two guarding wings to limit pivoting of the corresponding guarding wing relative to the mounting frame.

9. The table saw guard as claimed in claim 8, wherein each one of the two guarding wings has an elastic positioning unit extending into the arc-shaped hole; and when said guarding wing is pivoted relative to the mounting frame and lifted, the elastic positioning unit approaches the corresponding limiting screw and is configured to be compressed by the corresponding limiting screw, recover elastically, and then abut against the corresponding limiting screw to position said guarding wing.

10. The table saw guard as claimed in claim 1, wherein the riving knife has a mounting hole disposed on the knife body; and the table saw guard has two anti-kickback pawls pivotally connected to the mounting hole of the riving knife.

* * * * *